US007875569B2

(12) United States Patent
Roev et al.

(10) Patent No.: US 7,875,569 B2
(45) Date of Patent: Jan. 25, 2011

(54) SUPPORTED CATALYST, METHOD FOR PREPARING THE SAME, CATHODE ELECTRODE COMPRISING THE SAME, AND FUEL CELL COMPRISING THE CATHODE ELECTRODE

(75) Inventors: Victor Roev, Yongin-si (KR); Sang-hyuk Suh, Yongin-si (KR); Kyung-jung Kwon, Yongin-si (KR); Hae-kyoung Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 555 days.

(21) Appl. No.: 11/877,881

(22) Filed: Oct. 24, 2007

(65) Prior Publication Data

US 2008/0171654 A1 Jul. 17, 2008

(30) Foreign Application Priority Data

Jan. 15, 2007 (KR) ...................... 10-2007-0004416

(51) Int. Cl.
| | |
|---|---|
| H01M 4/88 | (2006.01) |
| H01M 8/00 | (2006.01) |
| H01M 8/10 | (2006.01) |
| H01M 4/36 | (2006.01) |
| H01M 4/38 | (2006.01) |
| H01M 4/92 | (2006.01) |
| H01M 4/02 | (2006.01) |
| H01M 4/94 | (2006.01) |
| H01M 4/90 | (2006.01) |
| B01J 21/18 | (2006.01) |
| B01J 23/00 | (2006.01) |
| B01J 23/40 | (2006.01) |
| B01J 23/74 | (2006.01) |
| C22C 5/04 | (2006.01) |
| C22C 5/02 | (2006.01) |

(52) U.S. Cl. ........................ 502/180; 502/101; 502/182; 502/185; 420/461; 420/462; 420/463; 420/464; 420/466; 420/468; 420/507; 420/512; 429/400; 429/479; 429/484; 429/485; 429/487; 429/523; 429/524; 429/525; 429/526; 429/527

(58) Field of Classification Search ................. 502/101, 502/180, 182, 185; 420/461–464, 466, 468, 420/507, 512; 429/400, 479, 484, 485, 498, 429/523, 524, 525, 526, 527
See application file for complete search history.

(56) References Cited

U.S. PATENT DOCUMENTS

| | | | | |
|---|---|---|---|---|
| 6,686,308 | B2 * | 2/2004 | Mao et al. | 502/180 |
| 6,797,667 | B2 * | 9/2004 | Ruth et al. | 502/182 |
| 7,037,873 | B2 * | 5/2006 | Kato | 502/180 |
| 7,150,866 | B2 * | 12/2006 | Wieland et al. | 423/652 |
| 7,381,682 | B1 * | 6/2008 | Jia et al. | 502/327 |
| 7,589,043 | B2 * | 9/2009 | Yoo et al. | 502/180 |
| 2006/0094597 | A1 | 5/2006 | Goia et al. | |

FOREIGN PATENT DOCUMENTS

KR    10-2007-0004416    *    6/2008

OTHER PUBLICATIONS

Office Action issued on Oct. 26, 2007 by the Korean Intellectual Property Office for Korean Patent Application No. 2007-4416.

* cited by examiner

Primary Examiner—Patricia L Hailey
(74) Attorney, Agent, or Firm—Lee & Morse, P.C.

(57) ABSTRACT

A supported catalyst includes a carbonaceous catalyst support and first metal-second metal alloy catalyst particles adsorbed on the surface of the carbonaceous catalyst support, wherein the difference between a D10 value and a D90 value is in the range of 0.1 to 10 nm, wherein the D10 value is a mean diameter of a randomly selected 10 wt % of the first metal-second metal alloy catalyst particles and the D90 value is a mean diameter of a randomly selected 90 wt % of the alloy catalyst particles. The supported catalyst has excellent membrane efficiency in electrodes for fuel cells due to uniform alloy composition of a catalyst particle and supported catalysts that do not agglomerate.

21 Claims, 12 Drawing Sheets

50nm

50nm

50nm

50nm

SUPPORTED CATALYST, METHOD FOR PREPARING THE SAME, CATHODE ELECTRODE COMPRISING THE SAME, AND FUEL CELL COMPRISING THE CATHODE ELECTRODE

CROSS-REFERENCE TO RELATED APPLICATION

This application claims the benefit of Korean Application No. 2007-4416, filed Jan. 15, 2007 in the Korean Intellectual Property Office, the disclosure of which is incorporated herein by reference.

BACKGROUND OF THE INVENTION

1. Field of the Invention

Aspects of the present invention relate to a supported catalyst, and more particularly, to a supported catalyst having excellent membrane efficiency in electrodes for fuel cells due to a uniform alloy composition of catalyst particles and supported catalysts which are not agglomerated, a method of preparing the supported catalyst, a cathode electrode including the supported catalyst, and a fuel cell including the cathode electrode.

2. Description of the Related Art

As used generally in the art, the term "supported catalyst" refers to a catalyst composed of a catalyst component and a porous catalyst support to which the catalyst component adheres. The porous catalyst support typically has many pores, and thus has a very large surface area. Such a large surface area provides a large area in which many catalyst components can be dispersed. Supported catalysts are widely used to accelerate various reactions in various fields.

An example of a supported catalyst is a carbon supported metal catalyst. The carbon supported metal catalyst includes porous carbon particles as a catalyst support and catalytic metal particles as a catalyst component. Carbon supported metal catalysts are also widely used to accelerate various reactions in various fields.

An example of a carbon supported metal catalyst is a catalyst contained in an electrode for a fuel cell. More particularly, the cathode and/or anode of fuel cells such as a phosphoric acid fuel cell (PAFC), a polymer electrolyte membrane fuel cell (PEMFC) or a direct methanol fuel cell (DMFC) contain a carbon supported metal catalyst that accelerates an electrochemical oxidation of a fuel and/or an electrochemical reduction of oxygen. In such fuel cells, carbon particles act both as a catalyst support and as an electron conductor. Pt and Pt/Ru alloy, etc. are generally used as the catalytic metal particles.

In a conventional method of preparing a supported catalyst disclosed in U.S. Pat. No. 5,068,161, a catalyst metal precursor is adsorbed onto a catalyst support by adding a catalyst metal precursor solution into a catalyst support dispersion solution. The catalyst metal precursor which is adsorbed on the surface of the catalyst support is reduced to catalytic metal particles by adding a reduction solution to the mixture, and then the resultant is freeze-dried to prepare a supported catalyst powder.

As is well-known in the art, one of the factors affecting the activity of a supported catalyst is the total surface area of the catalytic metal particles supported on the catalyst support. The main factors affecting the total surface area of catalytic metal particles in a supported catalyst are the average size of catalytic metal particles and the amount by weight of catalytic metal particles. That is, for a given amount of catalytic metal particles over an entire supported catalyst, the total surface area of catalytic metal particles supported on the supported catalyst generally increases as the average size of catalytic metal particles decreases. In addition, for a given size of catalytic metal particles, the total surface area of catalytic metal particles supported on the supported catalyst generally increases as the amount of catalytic metal particles in a supported catalyst increases.

Thus, to increase the total surface area of catalytic metal particles in a supported catalyst, the catalytic metal particles may be made smaller and/or the amount of the catalytic metal particles supported on the catalyst support may be increased.

For example, as the activity of a carbon supported metal catalyst contained in an electrode of a fuel cell such as PAFC, PEMFC, and DMFC increases, the power density of energy generation systems in the fuel cell increases while energy conversion efficiency is appropriately maintained. Accordingly, the ratio of the amount of generated power to costs for manufacturing a fuel cell stack increases, and the ratio of the amount of generated power to the weight or volume of the fuel cell stack increases.

However, in supported catalysts prepared according to conventional methods, as the loading amount of catalytic metal particles increases, the average size of catalytic metal particles supported also generally increases. For this reason, the ability to improve the catalytic activity of a supported catalyst by controlling the average size of catalytic metal particles and the loading amount of catalytic metal particles is limited. Moreover, in supported catalysts prepared according to conventional methods, it is difficult to reduce the average size of catalytic metal particles even by reducing the loading amount of catalytic metal particles. Thus, a technique for reducing the average size of catalytic metal particles supported on a catalyst support in a loading amount of catalytic metal particles more than or equal to the conventional loading amount of catalytic metal particles would be advantageous.

SUMMARY OF THE INVENTION

Aspects of the present invention provide a supported catalyst in which first metal-second metal alloy catalyst particles supported on a carbonaceous catalyst support are not agglomerated.

Aspects of the present invention also provide a method of preparing a supported catalyst in which first metal-second metal alloy catalyst particles supported on a carbonaceous catalyst support do not agglomerate.

Aspects of the present invention also provide a cathode electrode including the supported catalyst.

Aspects of the present invention also provide a fuel cell including the cathode electrode.

According to an embodiment of the present invention, there is provided a supported catalyst including: a carbonaceous catalyst support; and first metal-second metal alloy catalyst particles adsorbed on the surface of the carbonaceous catalyst support, wherein the difference between a D10 value and a D90 value is in the range of 0.1 to 10 nm, wherein the D10 value is a mean diameter of a randomly selected 10 wt % of the first metal-second metal alloy catalyst particles and the D90 value is a mean diameter of randomly selected 90 wt % of the first metal-second metal alloy catalyst particles.

According to an aspect of the present invention, the amount of the first metal in the first metal-second metal alloy catalyst particles may be in the range of 40 to 60 wt % based on the total weight of the supported catalyst.

According to an aspect of the present invention, the difference in an atomic percentage of the second metal based on 100 atomic percent of the first metal-second metal alloy at two randomly selected regions on a first metal-second metal alloy catalyst particle of the supported catalyst is less than 30 percent.

According to another embodiment of the present invention, there is provided a method of preparing a supported catalyst, the method including: preparing a first metal catalyst precursor solution by mixing a first metal catalyst precursor and a polyol; preparing a carbonaceous catalyst support solution by mixing a carbonaceous catalyst support, a polyol and water; mixing the first metal catalyst precursor solution and the carbonaceous catalyst support solution to obtain a first mixture; adjusting the pH of the first mixture to be in a predetermined range, and heating and cooling the first mixture; preparing a second metal catalyst precursor solution by mixing a second metal catalyst precursor with water; adding the second metal catalyst precursor solution to the pH-adjusted first mixture to obtain a second mixture, and adjusting the pH of the second mixture; filtering, washing, and drying the pH-adjusted second mixture; reducing the filtered, washed and dried second mixture in a gas phase; and purifying, washing, and drying the gas phase reduced second mixture.

According to another aspect of the present invention, there is provided a supported catalyst made by the above method.

According to another aspect of the present invention, there is provided a supported catalyst comprising a carbonaceous catalyst support; and first metal-second metal alloy catalyst particles adsorbed on the surface of the carbonaceous catalyst support, wherein 99.5 to 100% of the diameters of the first metal-second metal alloy catalyst particles are within the range of 2 to 20 nm According to another embodiment of the present invention, there is provided a cathode electrode including the supported catalyst.

According to another embodiment of the present invention, there is provided a fuel cell having a cathode electrode including the supported catalyst.

According to another aspect of the present invention, the fuel cell may be a polymer electrolyte membrane fuel cell (PEMFC).

The supported catalyst including alloy catalyst particles according to aspects of the present invention may have excellent membrane efficiency in electrodes for fuel cells due to a uniform alloy composition of catalyst particles that are not agglomerated.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
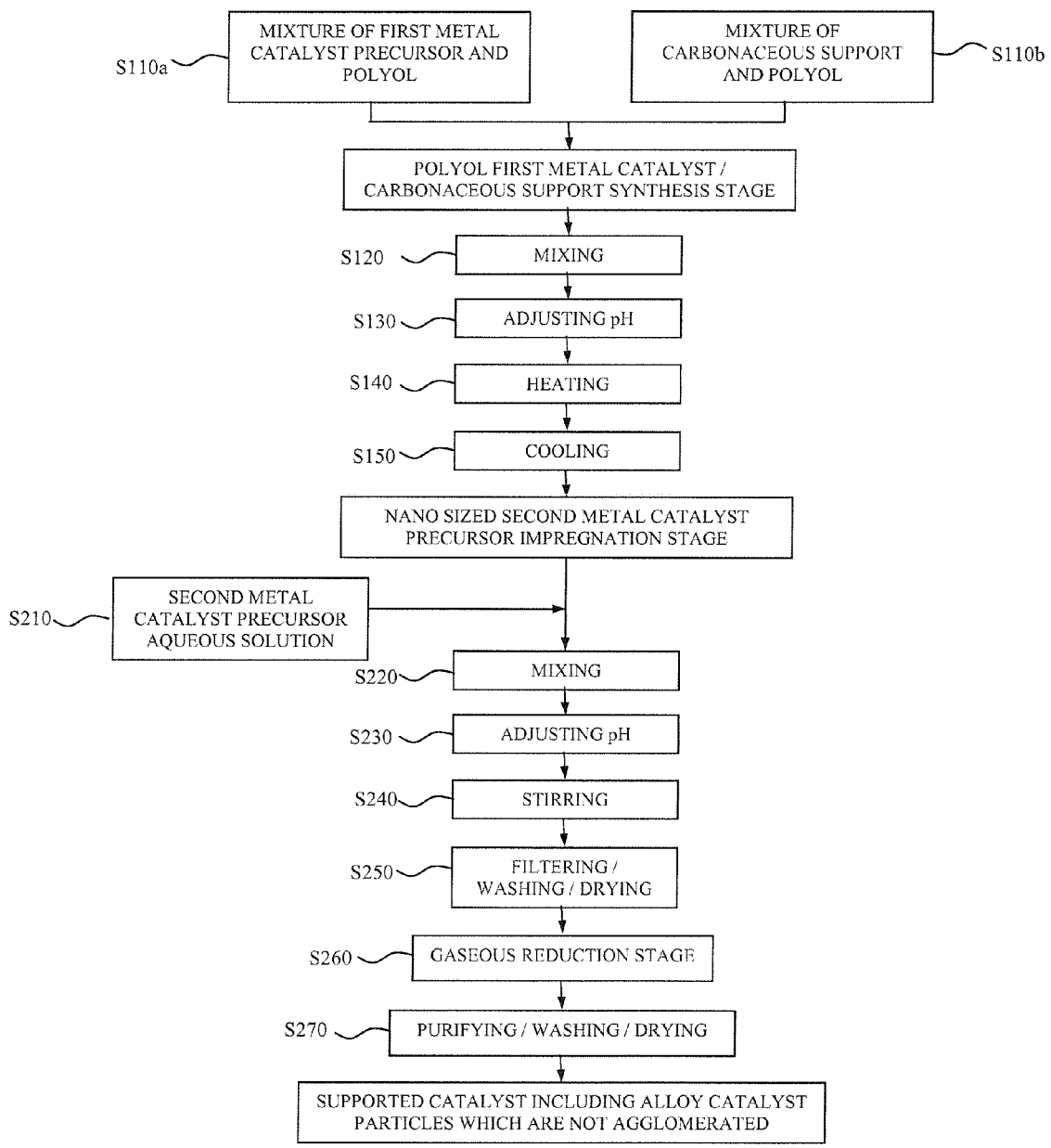
FIG. 1 is a diagram illustrating processes of a method of preparing a supported catalyst according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. Aspects of the invention may, however, be embodied in many different forms and should not be construed as being limited to the embodiments set forth herein; rather, these embodiments are provided so that this disclosure will be thorough and complete, and will fully convey the concept of the invention to those skilled in the art.

A supported catalyst according to an embodiment of the present invention includes: a carbonaceous catalyst support and first metal-second metal alloy catalyst particles adsorbed on the surface of the carbonaceous catalyst support. The difference between a D10 value and a D90 value is in the range of 0.1 to 10 nm, wherein the D10 value is a mean diameter of a randomly selected 10 wt % of the alloy particles and the D90 is a mean diameter of a randomly selected 90 wt % of the alloy particles. As more specific, non-limiting examples, the difference between the D10 value and the D90 value may be 2 to 8 nm or more specifically, 4 to 7 nm.

As described above, the term "D10 value" refers to a mean diameter of particles corresponding to a randomly selected 10 wt % of the total particles, and the term "D90 value" refers to a mean diameter of particles corresponding to a randomly selected 90 wt % of the total particles. The D10 and D90 values can be measured using methods widely known in the art, such as, for example, using TEM images. The D10 and D90 values may also be obtained easily by measuring diameters using a measuring device such as a Zetamaster (Malvern), analyzing the measured data, counting the number of particles corresponding to each size range and calculating the D10 and D90 values based on the obtained data. The D10 value may be in the range of 11 to 17 nm. When the D10 value is greater than 17 nm, the reaction surface may be reduced. In addition, the D90 value may be in the range of 5 to 7 nm. When the D90 value is greater than 7 nm, the reaction area may be reduced.

A large difference between the D10 and the D90 values indicates that the diameters of the particles are widely distributed, and a narrow difference between the D10 and the D90 values indicates that the diameters of the particles are narrowly distributed. Accordingly, a difference between the D10 value and the D90 value of greater than 10 nm, indicates that agglomerations of the first metal-second metal alloy catalyst particles have been formed. A difference between the D10 value and the D90 value of 0 indicates that the diameters of all particles are almost the same, but this condition rarely occurs in actuality. According to aspects of the present invention, a difference between the D10 value and the D90 value may be at least 0.01 nm.

In the supported catalyst according to aspects of the present invention, agglomerations are not likely to be formed in the first metal-second metal alloy catalyst particles, and thus the first metal-second metal alloy catalyst particles are supported on the carbonaceous catalyst support with a considerably constant diameter distribution of the individual alloy catalyst particles. Thus, the problems of agglomeration that generally occur in conventional supported catalysts when the loading amount of the catalyst supported on a carbonaceous support increases can be overcome in the supported catalyst according to aspects of the present invention. In other words, the generation of alloy catalyst particles having a large diameter due to agglomeration can be inhibited, and the diameter distribution of the alloy catalyst particles can be kept within a narrow variation.

Particularly, 99.5 to 100% of the diameters of the first metal-second metal alloy catalyst particles in the supported catalyst according to aspects of the present invention are within the range of 2 to 20 nm. A diameter of greater than 20 nm, indicates that the particles are agglomerated. If the proportion of the first metal-second metal alloy catalyst particles in the supported catalyst having a particle diameter of less than 20 nm is less than 99.5%, indicating that too many agglomerations have been formed, the efficiency of the supported catalyst may decrease.

As described above, when the mean diameter of the alloy metal catalyst particles increases due to agglomeration, the reaction area may be reduced. Such agglomeration may become a serious problem as the amount of the alloy metal catalyst increases in the supported catalyst.

A mean particle diameter of the first metal-second metal alloy catalyst particles may be in the range of 2 to 5 nm, or, as a specific, non-limiting example, 3 to 4 nm. When the mean particle diameter of the first metal-second metal alloy catalyst particles is greater than 5 nm, the reaction area may be reduced. On the other hand, when the mean particle diameter of the first metal-second metal alloy catalyst particles is less than 2 nm, the particles may agglomerate.

The supported catalyst may further include unalloyed first metal catalyst particles. As described herein, a process of preparing first metal-second metal alloy catalyst particles includes alloying first metal particles with a second metal, but not all of the first metal particles become alloyed with the second metal. Thus, the prepared catalyst includes some unalloyed first metal particles. In the supported catalyst according to aspects of the present invention, the amount of the first metal in the first metal-second metal alloy catalyst particles may be in the range of 40 to 60 wt % based on the total weight of the supported catalyst.

As a non-limiting example, the amount of the second metal of the first metal-second metal alloy catalyst particles may be in the range of 0.01 to 5 wt % based on the total weight of the supported catalyst. When the amount of the second metal is less than 0.01 wt % based on the total weight of the supported catalyst, the efficiency of the supported catalyst may not be improved. On the other hand, when the amount of the second metal is greater than 5 wt %, the second metal may melt and leak from the supported catalyst to decrease proton conductivity in a membrane thereof.

The first metal may be Pt, Ru, Pd, Rh, Ir, Os or Au, or, more specifically, Pt, Au, or Pd, but is not limited thereto.

The second metal is a metal that can be alloyed with the first metal, and may be Co, Ni, Cu, Zn, V, Cr, Mn, Fe or Ti, but is not limited thereto. As a non-limiting example, the first metal may be Pt and the second metal may be Co, Ni, or Fe.

A difference in the amount of the second metal at two randomly selected regions on a first metal-second metal alloy catalyst particle may be in the range of 20 to 30 percent. In other words, the relative amount of the second metal in two randomly selected regions is based on 100 atomic percent of the first metal-second metal alloy catalyst particles. That is, in the supported catalyst according to aspects of the present invention, the second metal may be uniformly distributed in each of the first metal-second metal alloy catalyst particles.

In an embodiment of the present invention, a method of preparing a supported catalyst is provided. The method of preparing a supported catalyst includes: (a) preparing a first metal catalyst precursor solution by mixing a first metal catalyst precursor and a polyol; (b) preparing a carbonaceous catalyst support solution by mixing a carbonaceous catalyst support, a polyol and water; (c) mixing the first metal catalyst precursor solution and the carbonaceous catalyst support solution; (d) adjusting the pH of the mixture prepared in operation (c) to be in a predetermined range, and heating and cooling the mixture; (e) preparing a second metal catalyst precursor solution by mixing a second metal catalyst precursor with water; (f) adding the second metal catalyst precursor solution to the mixture prepared in operation (d), and adjusting the pH of the resultant; (g) filtering, washing, and drying the resultant obtained in operation (f); (h) reducing the resultant of operation (g) in a gas phase; and (i) purifying, washing, and drying the resultant of operation (h).

FIG. 1 is a schematic view illustrating processes of a method of preparing a supported catalyst according to an embodiment of the present invention.

According to the method of preparing the supported catalyst according to aspects of the present invention, a supported catalyst in which a nano sized first metal catalyst is supported on a carbonaceous catalyst support using a polyol process is prepared, a nano sized second metal catalyst precursor solution is mixed therewith to form nano sized first metal-second metal alloy particles. Then, a final supported catalyst is prepared by reducing the resultant in a gas phase. The nano sized second metal precursor is uniformly distributed in the prepared supported catalyst due to the high viscosity of the aqueous polyol solution used in the process. Thus, the first metal can be alloyed with the second metal at a lower temperature due to improved reactivity of the nano sized second metal precursor. As a result, agglomerations which occur due to collisions between alloy catalyst particles can be prevented. Thus, the supported catalyst prepared according to aspects the present invention includes few agglomerated alloy catalyst particles. The method will now be described in more detail.

In S110a, the first metal catalyst precursor is dissolved in a polyol to prepare a first metal catalyst precursor solution. The polyol may be ethylene glycol, diethylene glycol, triethylene glycol, or the like. The amount of the first metal catalyst precursor may be 0.2 to 0.8 parts by weight, or, as a specific, non-limiting example, 0.4 to 0.6 parts by weight based on 100 parts by weight of the total reaction solution of the polyol dissolving the metal precursors, the polyol dispersing carbon, and water. When the amount of the first metal catalyst precursor is less than 0.4 parts by weight, the amount of the total reaction solution increases, and thus the metal catalyst cannot be formed on carbon, but remains in the solution in a colloidal state. On the other hand, when the amount of the first metal catalyst precursor is greater than 0.6 parts by weight, the amount of the solution reducing the first metal catalyst precursor is not sufficient, and thus the particle sizes may increase.

The amount of the polyol may be in the range of $10^2$ to $2 \times 10^2$ parts by weight based on 100 parts by weight of the metal catalyst precursor. When the amount of the polyol is less than $10^2$ parts by weight, the reducing power of the first metal catalyst may decrease, and thus large sized particles are formed. On the other hand, when the amount of the polyol is greater than $2 \times 10^2$ parts by weight, the reducing power of the first metal catalyst may increase, and thus agglomerations may occur.

The first metal catalyst precursor can be various compounds according to the type of the first metal catalyst to be supported. For example, a first metal catalyst precursor having Pt may be $H_2PtCl_4$, $H_2PtCl_6$, $K_2PtCl_4$, $K_2PtCl_6$ or a mixture thereof, a first metal catalyst precursor having Ru may be $(NH_4)_2[RuCl_6]$, $(NH_4)_2[RuCl_5H_2O]$, or the like, and a first metal catalyst precursor having Au may be $H_2[AuCl_4]$, $(NH_4)_2[AuCl_4]$, $H[Au(NO_3)_4]H_2O$, or the like.

Meanwhile, in S110b, a graphite based carbonaceous catalyst support solution is prepared separately from the first metal catalyst precursor solution by dispersing a carbonaceous catalyst support in a mixed solution of a polyol and water. The carbonaceous catalyst support may have porosity, a surface area of 50 $m^2$/g or greater, or, more specifically, between 100 to 1200 $m^2$/g, a mean particle diameter of 10 to 300 nm, or, as a specific, non-limiting example, 20 to 100 nm, but is not limited thereto. When the surface area is less than the range described above, the loading capability of the catalyst is not sufficient.

Examples of the carbonaceous catalyst support may include at least one selected from the group consisting of carbon black, KETJEN BLACK (KB) (available from Akzo Chemie, Netherlands), acetylene black, graphitized carbon (GrCB), powdered activated carbon, carbon molecular sieve, carbon nanotubes, activated carbon having fine pores, and mesoporous carbon.

In the mixed solution of a polyol and water into which the carbonaceous catalyst support is dispersed, the amount of water may be in the range of 40 to 60 parts by weight based on 100 parts by weight the total mixed solution. When the amount of water is less than 40 parts by weight, there may not be a sufficient amount of water to act as a buffer during a reduction of the metal catalyst particles, as described later, and thus, the particle size may increase. On the other hand, when the amount of water is greater than 60 parts by weight, the relative concentration of polyol decreases, and thus, the metal particle size may increase. The graphite based carbonaceous catalyst support used herein may further be hydrophilically treated.

Then, in S120, the prepared first metal catalyst precursor solution is mixed with the carbonaceous catalyst support solution. In S130, the pH of the mixture is adjusted to be in the range of 9 and 13, or, as a specific, non-limiting example, between 10 and 11, and then heated. When the pH of the mixture is less than 9, the catalytic metal particles such as Pt are formed in a colloid state, and thus, a supported catalyst is not formed. On the other hand, when the pH of the mixture is greater than 13, the catalytic metal particles agglomerate on the carbon, and thus, the particle size may increase.

In S140 and S150, after adjusting the pH of the mixture to a predetermined range, the mixture is heated and cooled. The mixture is heated to a temperature in the range of 90 to 115° C., or, as a specific, non-limiting example, in the range of 105 to 110° C., and the heating rate may be in the range of 1.5 to 3.5° C./min, or, as a specific, non-limiting example, 2.1 to 2.4° C./min. When the heating temperature is less than 90° C., the catalytic metal particles are not completely reduced. On the other hand, when the heating temperature is higher than 115° C., the reaction solution suddenly boils, and thus, the particle size may increase, since the amount of water gets smaller in the reaction solution. Furthermore, when the heating rate is less than 1.5° C./min, the particle size may increase since the catalytic metal particles are formed too slowly. On the other hand, when the heating rate is greater than 3.5° C./min, agglomerations occur since the catalytic metal particles are too small. Then, the resultant is cooled to about 20 to 30° C., or, as a specific, non-limiting example, to room temperature (about 25° C.).

Meanwhile, in S210, a second metal catalyst precursor solution is prepared. That is, the second metal catalyst precursor solution is prepared by dissolving the second metal catalyst precursor in water. The amount of the second metal catalyst precursor may be in the range of 1 to 2.5 parts by weight based on 100 parts by weight of the second metal catalyst precursor solution. When the amount of the second metal catalyst precursor is less than 1 part by weight based on 100 parts by weight of the second metal catalyst precursor solution, the second metal catalyst precursor is not adsorbed on the surface of a support. On the other hand, when the amount of the second metal catalyst precursor is greater than 2.5 parts by weight based on 100 parts by weight of the second metal catalyst precursor solution, an undesirable water soluble second metal complex is formed in addition to an insoluble second metal hydroxide. The formed water soluble second metal complex is removed during the washing operation. Such a process is a waste of the second metal.

The second metal catalyst precursor may be a metal compound containing a metal that can be alloyed with the first metal catalyst. For example the second metal may be Co, Ni, Cu, Zn, V, Cr, Mn, Fe, Ti, or the like. As a non-limiting example, when the second metal catalyst precursor is Co, compounds such as $Co(OH)_2$, $Co(NO_3)_2$ and a mixture thereof may be used.

In S220, the prepared second metal catalyst precursor solution is mixed with pH-adjusted mixture of the first metal catalyst precursor solution and the carbonaceous catalyst support solution. In S230, the pH of the mixture is adjusted to between 8 and 10, or, as a specific, non-limiting example, to about 8, using a basic compound such as $NH_4OH$, and in S240, the mixture is stirred for about 1 hour. When the pH of the mixture is less than 8, the second metal hydroxide is not precipitated. On the other hand, when the pH of the mixture is greater than 10, the alloy cannot easily form after reduction in a gas phase, as described later, and the amount of the second metal in the first metal-second metal alloy may decrease. In S250, after adjusting the pH of the mixture, the mixture is filtered, washed, and dried.

In S260, the dried resultant is reduced in a gas phase in a hydrogen atmosphere at a temperature in the range of about 300 to 350° C., or, as a specific, non-limiting example, at about 300° C. Since the temperature of the gas phase reduction according to aspects of the present invention is considerably lower compared to a conventional temperature, the alloy catalyst particles do not agglomerate during the gaseous reduction stage. The gas phase reduction can be performed at a low temperature due to the increased reactivity of the second metal precursor, which is achieved by providing the second metal precursor as a nanosized particle solution.

Figure 4:
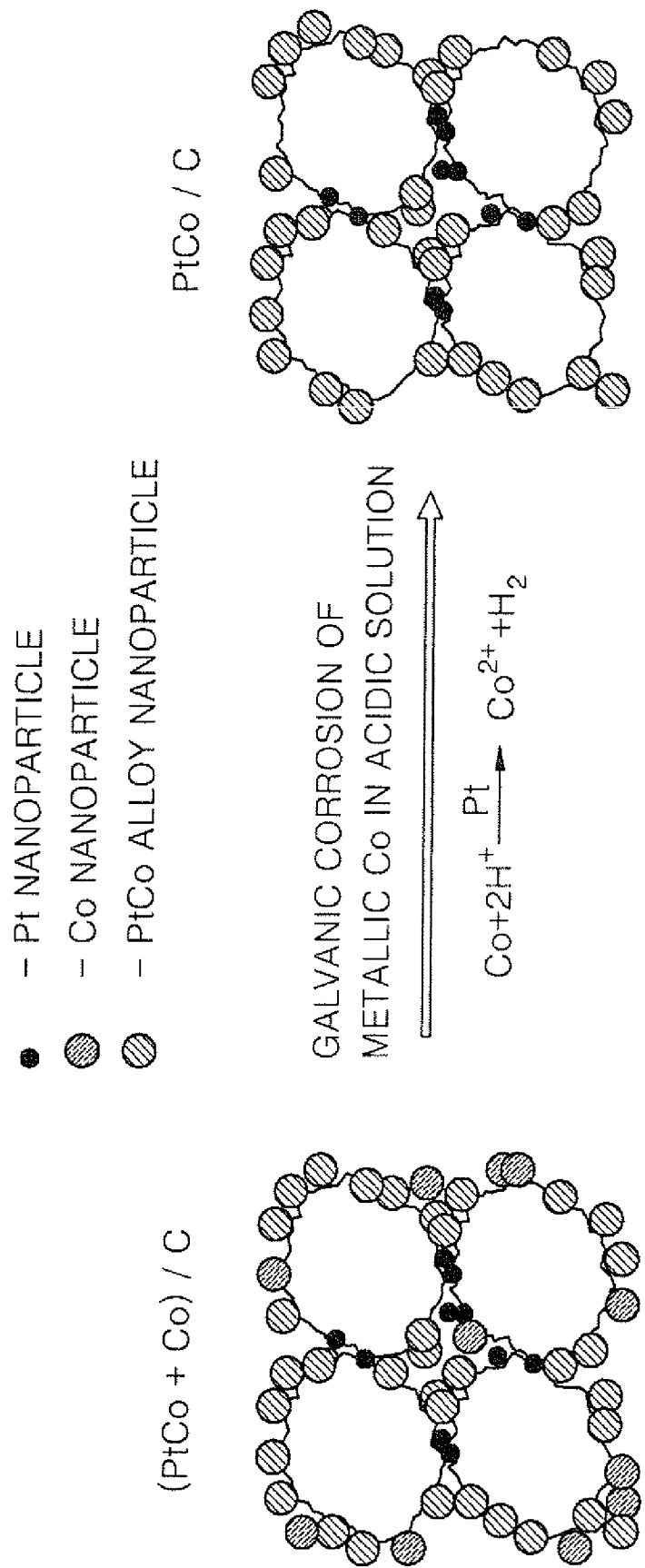
FIG. 4 is a schematic representation of an acid treatment in a method of preparing a supported catalyst according to an embodiment of the present invention.

In S270, the gas phase reduced resultant is acid treated to remove the second metal particles which are not alloyed with the first metal particles, since the non-alloyed second metal particles may have harmful effects on a membrane. FIG. 4 is a schematic view illustrating an acid treatment in a method of preparing a supported catalyst according to an embodiment of the present invention when the second metal is Co. Here, the unalloyed Co particles are removed in an acidic solution while galvanic corrosion occurs. Finally, the supported catalyst is prepared by a work-up process in which the resultant is washed and dried.

Aspects of the present invention also provide a fuel cell including the supported catalyst. The fuel cell includes a cathode, an anode, and an electrolyte membrane interposed between the cathode and the anode. At least one of the cathode and the anode may include the supported catalyst. For example, the cathode may include the supported catalyst.

The fuel cell according to aspects of the present invention may be a phosphoric acid fuel cell (PAFC), a polymer electrolyte membrane fuel cell (PEMFC), or a direct methanol fuel cell (DMFC). For example, the fuel cell may be a PEMFC. The structure of the fuel cell and a method of preparing the fuel cell are not limited, and are described in various references in detail and thus will not be described herein in detail.

Aspects of the present invention will be described in greater detail with reference to the following examples. The following examples are for illustrative purposes and are not intended to limit the scope of the invention.

Preparation Example 1

1.3 g of $H_2PtCl_6 \cdot xH_2O$ as a first metal catalyst precursor was dissolved in 2 g of ethylene glycol to prepare a first metal catalyst precursor solution. 0.5 g of carbon (KETJEN BLACK) was added to 250 g of a mixed solution of ethylene glycol and water (EG 200 g, $H_2O$ 50 g) and dispersed using a sonicator for 15 minutes to prepare a carbonaceous catalyst support solution. The first metal catalyst precursor solution was mixed with the carbonaceous catalyst support solution, and the mixture was stirred for 1 hour. After that, the mixture was adjusted to have a pH of 11 using a 20% NaOH solution, and further stirred for 1 hour. The resultant was heated from room temperature (25° C.) to 120° C. for 30 minutes, maintained for 4 hours, and cooled to room temperature. The mixture of the first metal catalyst precursor solution and the carbonaceous catalyst support solution was stirred for 12 hours, and 4 g of $Co(NO_3)_2 \cdot 6H_2O$ as a second metal catalyst precursor was added thereto, and the mixture was stirred for 30 minutes. The mixture was adjusted to have a pH 9 using a 20% NaOH solution, and the mixture was stirred for 10 minutes. The resultant was centrifuged three times at 9000 rpm, and dried under a nitrogen atmosphere at 80° C. The dried, supported catalyst was pulverized into powder and reduced in a hydrogen atmosphere at 300° C. for 10 minutes. The reduced supported catalyst was cooled to room temperature added to a solution including 200 ml of water and 10 ml of 85% $H_3PO_4$ and stirred until hydrogen generation was terminated. The resultant was washed three times with 200 ml of water, centrifuged, and dried in air at 80° C.

Thus, a supported catalyst of 44.3 wt % Pt/3.8 wt % Co/KB catalyst (a mean diameter: 4.5 nm) was prepared. The difference between the D10 value and the D90 value of the final supported catalyst was 6 nm as calculated using TEM images.

Figure 5A:
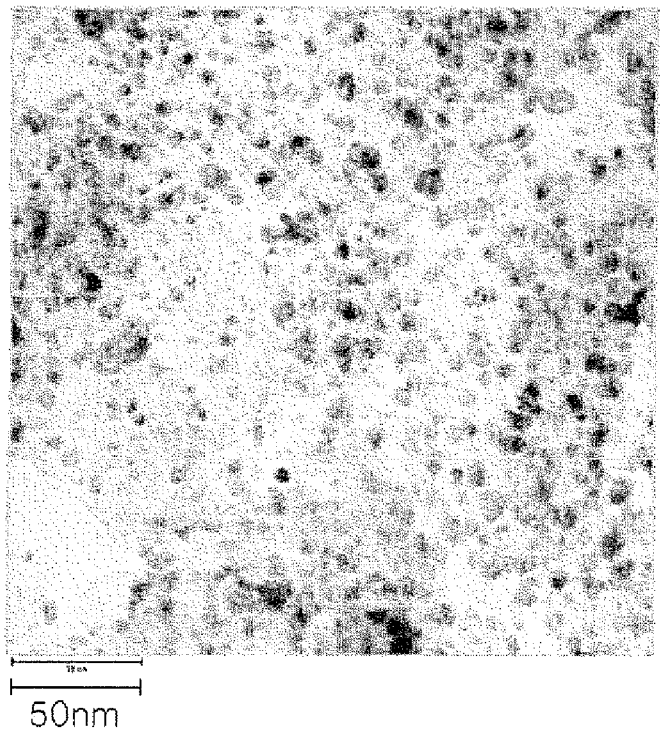
FIGS. 5A and 5B are TEM images of a supported catalyst according to an embodiment of the present invention.

FIG. 5A is a TEM image of the prepared supported catalyst of Preparation Example 1.

Preparation Example 2

A supported catalyst of 46.9 wt % Pt/4.2 wt % Co/KB catalyst (mean diameter: 4.6 nm) was prepared in the same manner as in Preparation Example 1.

Figure 5B:
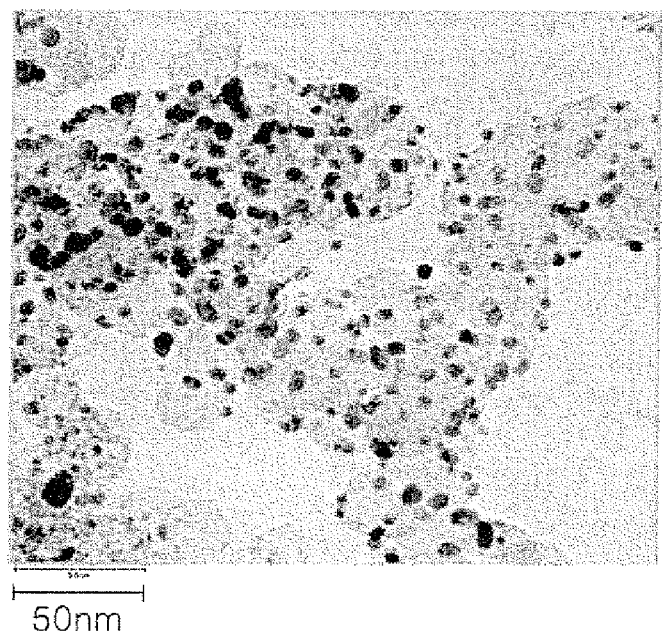

FIG. 5B is a TEM image of the prepared supported catalyst of Preparation Example 2.

Figure 5C:
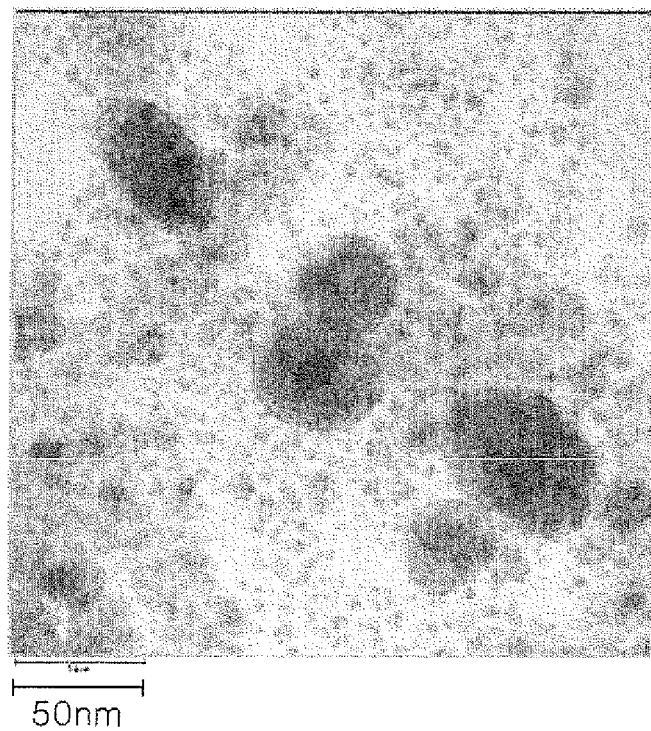
FIGS. 5C and 5D are TEM images of commercially available supported catalysts.
Figure 5D:
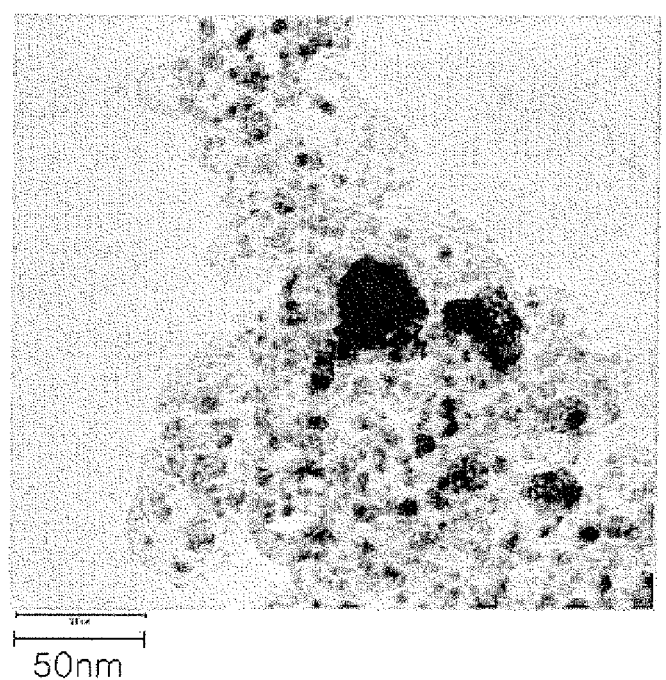

FIG. 5C is a TEM image of a conventional 46.8 wt % Pt/4.7 wt % Co/C catalyst (mean diameter: 4.5 nm), and FIG. 5D is a TEM image of a conventional 46.8 wt % Pt/4.7 wt % Co/C catalyst (mean diameter: 4.5 nm). Agglomerations were not observed in FIGS. 5A and 5B, but were observed in FIGS. 5C and 5D.

Preparation Example 3

A supported catalyst of 47.3 wt % Pt/4.5 wt % Co/GrCB-K catalyst (mean diameter: 6.0 nm) was prepared in the same manner as in Preparation Example 1.

Figure 2A:
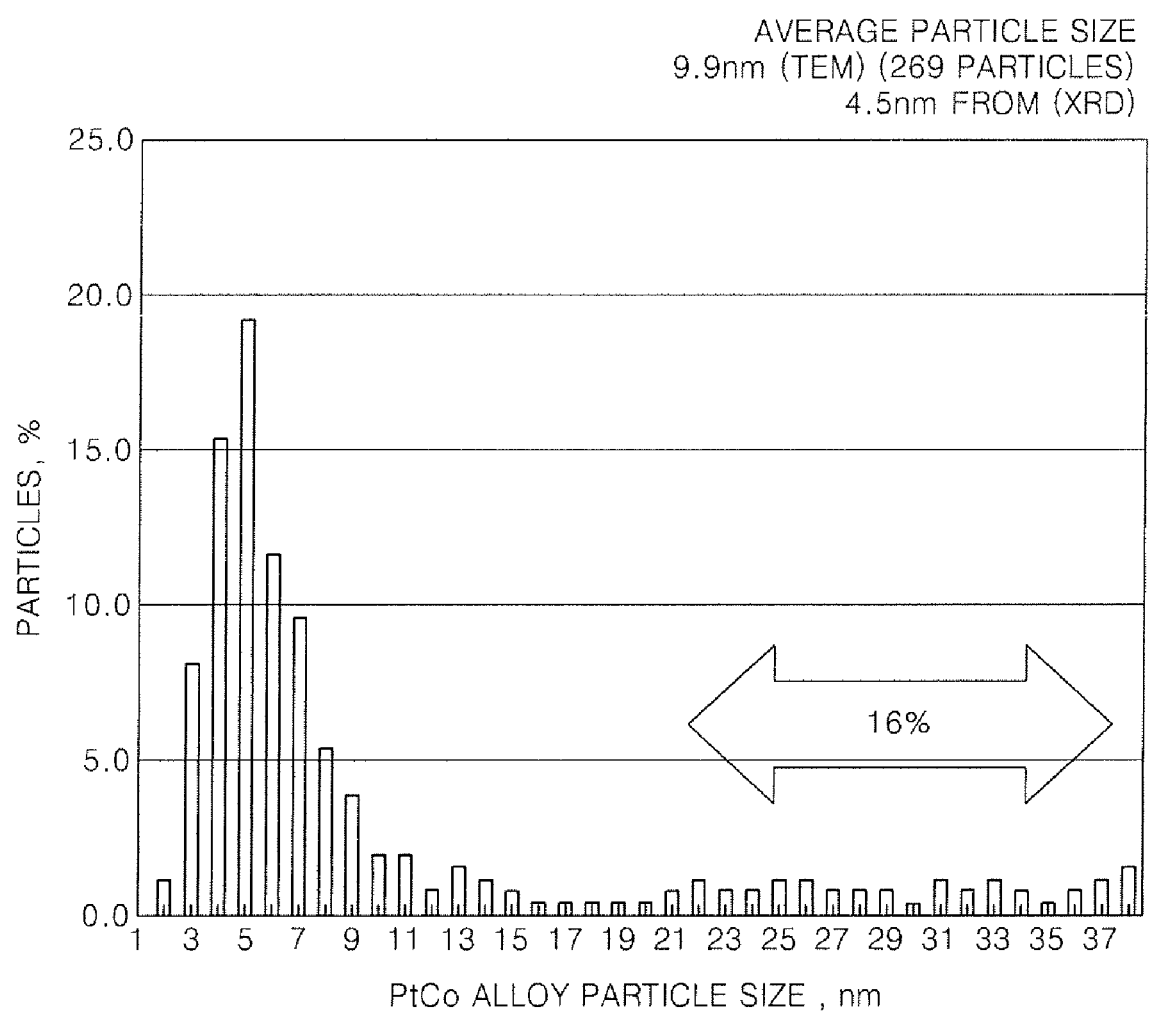
FIGS. 2A and 2B are graphs illustrating the diameter distribution of alloy catalyst particles in a commercially available supported catalyst and a supported catalyst according to an embodiment of the present invention, respectively.
Figure 2B:
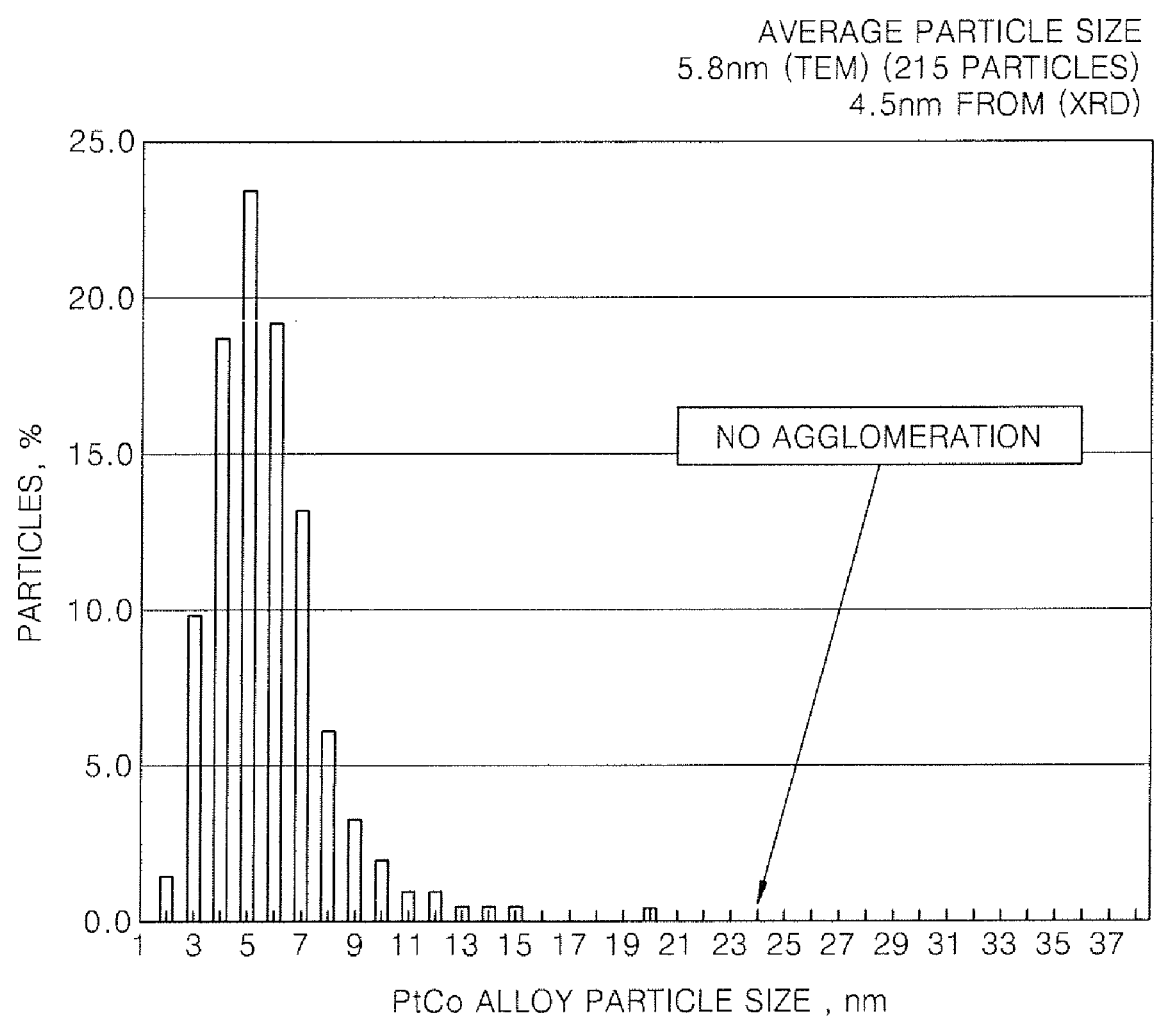

FIG. 2B is a graph illustrating the diameter distribution of alloy catalyst particles in a supported catalyst according to Preparation Example 1. FIG. 2A is a graph illustrating the diameter distribution of alloy catalyst particles in a conventional supported catalyst. While 16% of the diameter of alloy catalyst particles is greater than 20 nm in the conventional supported catalyst, the supported catalyst prepared according to aspects of the present invention does not have any alloy catalyst particles having a diameter greater than 20 nm.

Figure 3A:
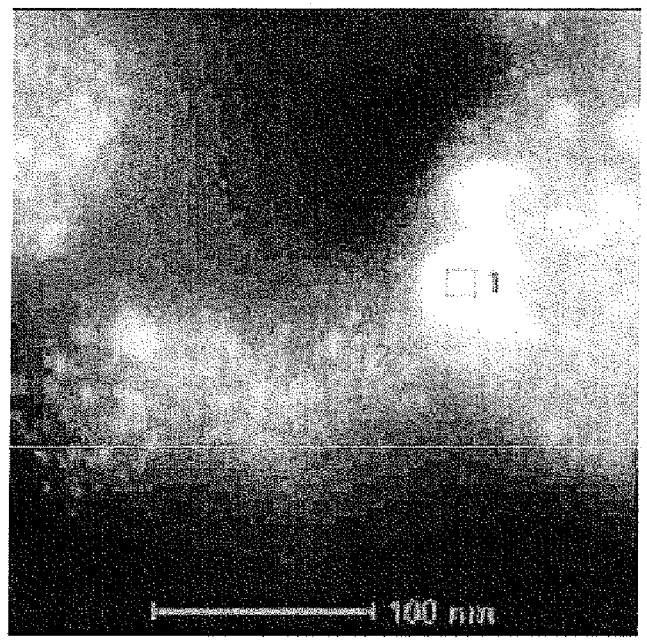
FIGS. 3A and 3B are EDX images of a commercially available supported catalyst and a supported catalyst according to an embodiment of the present invention, respectively.
Figure 3B:
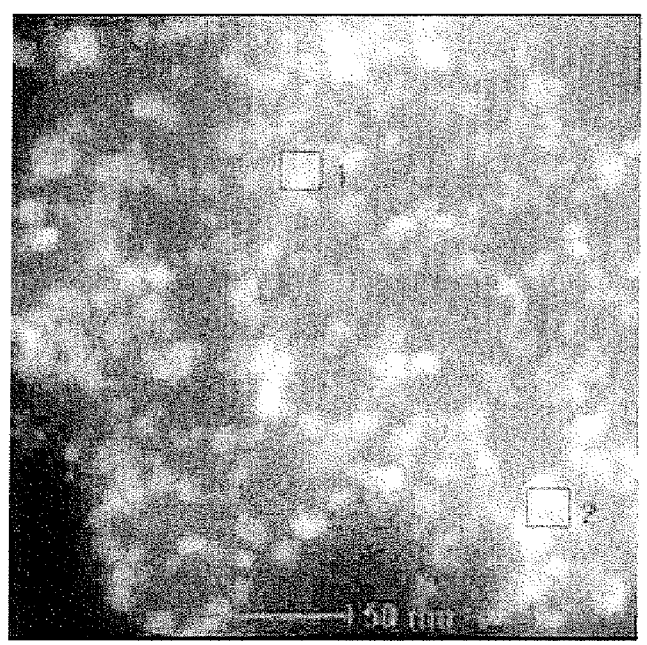

FIGS. 3A and 3B are energy-dispersive x-ray (EDX) images of a commercially available supported catalyst and a supported catalyst according to an embodiment of the present invention, respectively, in which a first region and a second region are randomly selected in each of the supported catalysts to measure the ratio of the first metal and the second metal in each of the regions. The supported catalyst prepared in Preparation Example 2 was used as the supported catalyst of the embodiment of the present invention, and a Pt/C TEC 36E52 catalyst obtained from TKK Co. (corresponds to Comparative Example in Table 1) was used as the commercially available supported catalyst. The analysis results are shown in Table 1. As shown in Table 1, the second metal was uniformly included in the supported catalyst prepared according to Preparation Example 2. According to FIG. 3B (Preparation Example 2), the amount of the second metal (Co) was 25.296 atomic percent in the first region, and 24.405 atomic percent in the second region. According to FIG. 3A, the amount of the second metal (Co) was 28.289 atomic percent in the first region, and 23.625 atomic percent in the second region. Thus, the difference of the amounts of the second metal in the first and second regions in FIG. 3B (that is in Preparation Example 2) was smaller than that of the supported catalyst of the commercially available supported catalyst. As a result, the second metal catalyst was more uniformly distributed over the entire surface area of the supported catalyst of Preparation Example 2.

TABLE 1

|  |  | Weight percent | | Atomic percent | |
| --- | --- | --- | --- | --- | --- |
|  |  | 1 region | 2 region | 1 region | 2 region |
| Preparation | Co | 9.268 | 8.885 | 25.269 | 24.405 |
| Example 2 | Pt | 90.732 | 91.114 | 74.730 | 75.594 |
| Comparative | Co | 10.648 | 8.546 | 28.289 | 23.625 |
| Example | Pt | 89.351 | 91.454 | 71.710 | 76.374 |

Figure 6A:
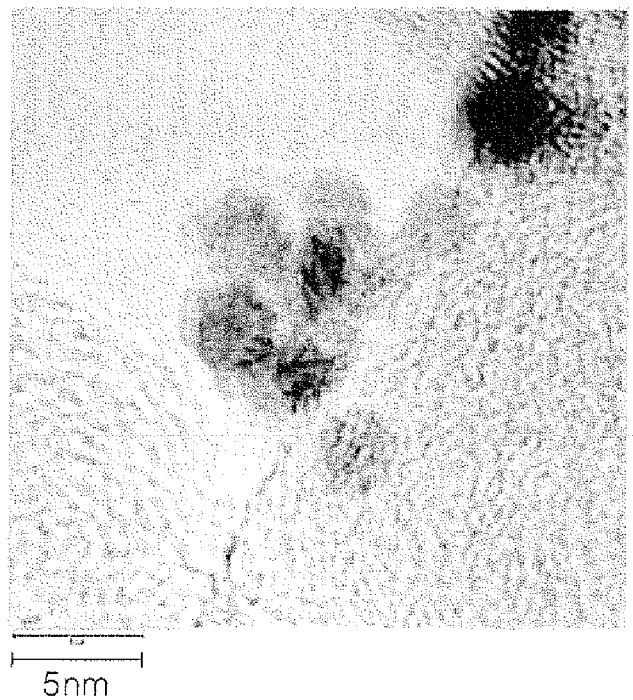
FIGS. 6A and 6B are a TEM image and a SEM image, respectively, of a supported catalyst according to an embodiment of the present invention.
Figure 6B:
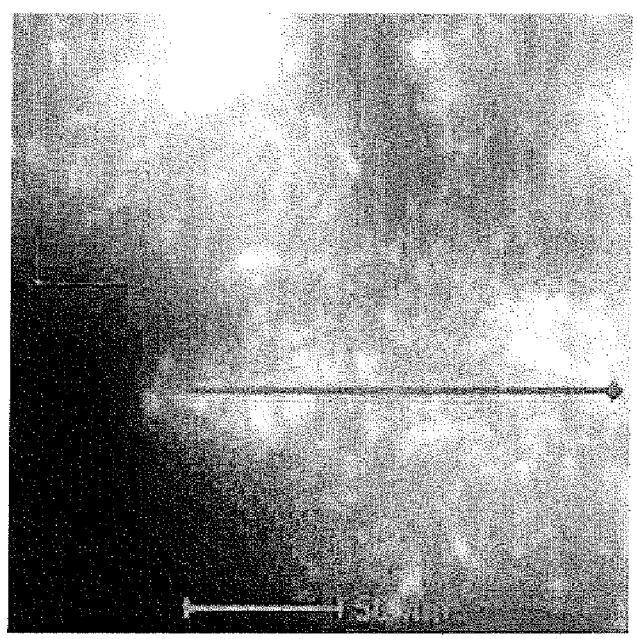

FIGS. 6A and 6B are a TEM image and a SEM image, respectively, of a supported catalyst according to Preparation Example 1. As illustrated in FIG. 6A, the fact that the particles are forming angles indicates that Co nanoparticles are attached to Pt at each angle.

Figure 7:
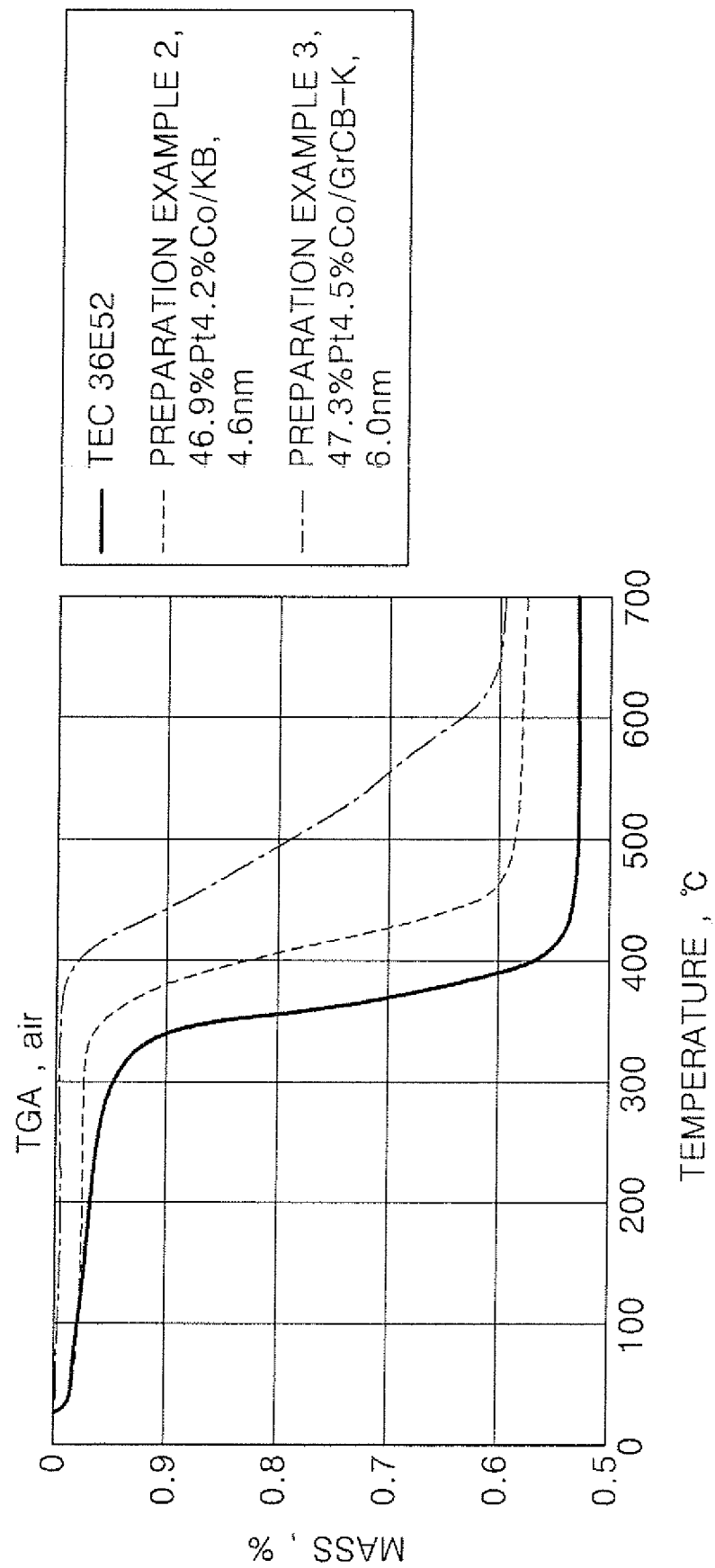
FIG. 7 is a graph illustrating the results of a differential scanning calorimetry (DSC) and a thermo gravimetric analysis (TGA) of a supported catalyst according to an embodiment of the present invention.

FIG. 7 is a graph illustrating the results of a thermogravimetric analysis (TGA) of a Pt/C TEC 36E52 (46.8% Pt/4.7% Co, 5.2 nm) catalyst obtained from TKK Co., and of supported catalysts prepared according to Preparation Examples 2 and 3. Referring to FIG. 7, the supported catalysts of Preparation Examples 2 and 3 have thermal stability at a higher temperature.

Figure 8A:
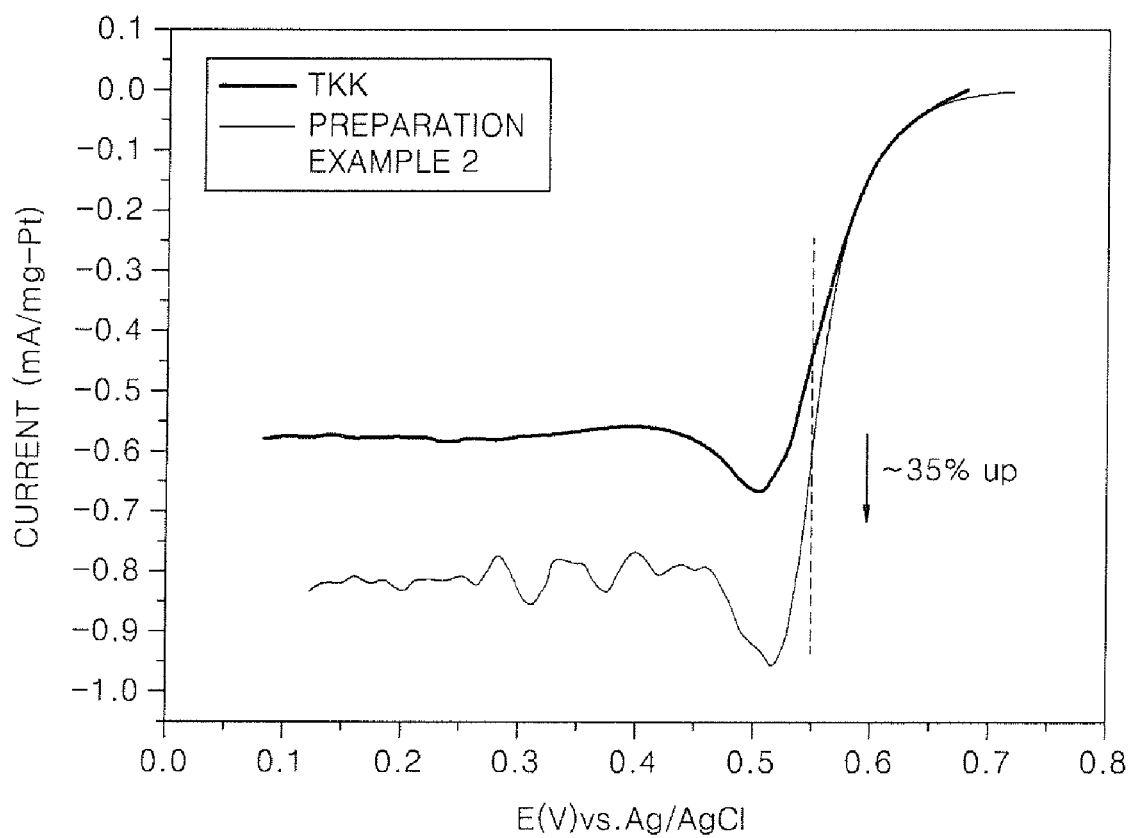
FIGS. 8A and 8B are graphs illustrating the current density of a commercially available supported catalyst and a supported catalyst according to an embodiment of the present invention, respectively.
Figure 8B:
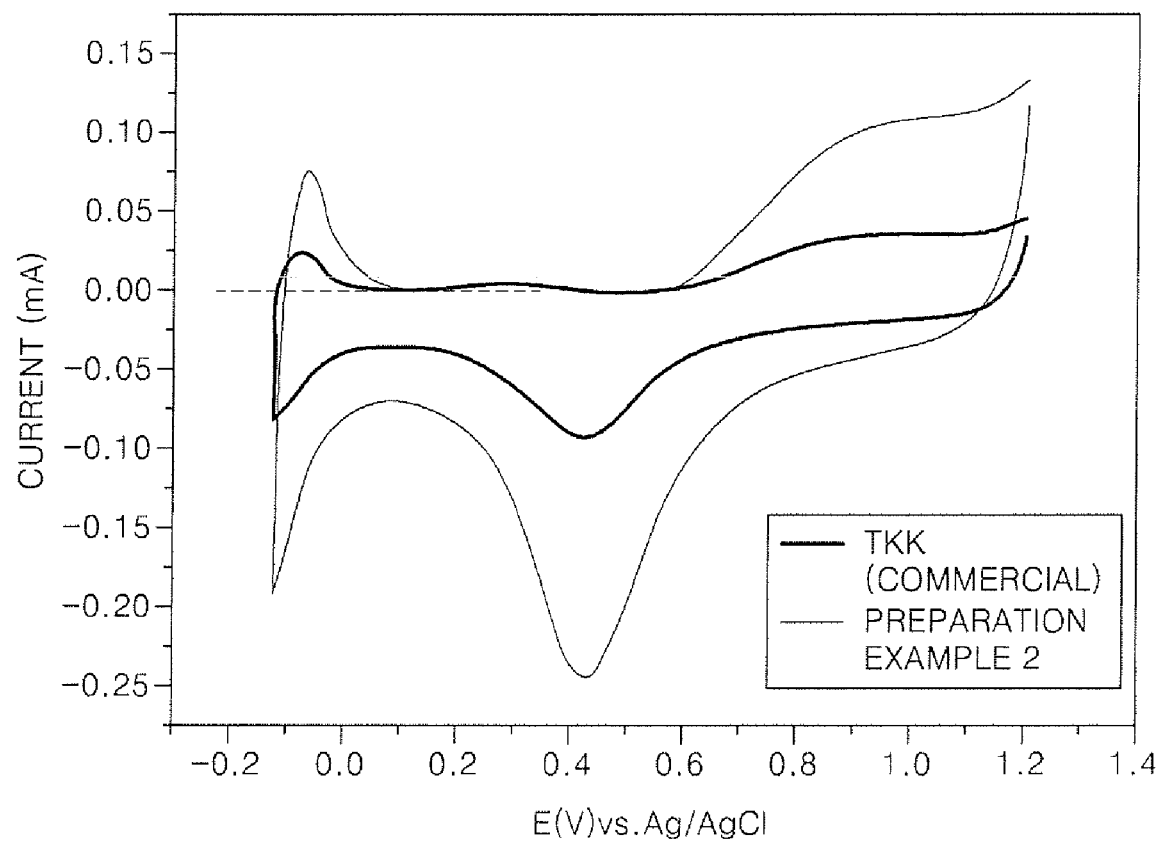

FIGS. 8A and 8B are graphs illustrating the current density of a Pt/C TEC 36E52 (46.8% Pt/4.7% Co, 5.2 nm) catalyst obtained from TKK Co., and of a supported catalyst according to Preparation Example 2. Referring to FIG. 8A, a cathodic current of the commercially available catalyst at a standard point (0.55V) was 0.432 mA/mg, and a cathodic current of the supported catalyst prepared according to Preparation Example 2 was 0.574 mA/mg, an increase of about 35%. FIG. 8B is a graph illustrating adsorption and separation peaks of hydrogen. The area having electrochemical activities can be calculated using the area shown in the graph. The calculated area is shown in Table 2.

TABLE 2

|  | Area having electrochemical activities (cm$^2$/Pt-g) |
| --- | --- |
| TKK | 6.08 |
| Preparation Example 2 | 18.63 |

As shown in Table 2, the supported catalyst according to Preparation Example 2 has a larger activated area than a commercially available catalyst.

Example 1

Preparation of Fuel Cell

A fuel cell including a catalyst layer using the supported catalyst prepared in Preparation Example 1 was prepared according to the following processes.

In the fuel cell, PtRu/C (TKK) (1.0 mg/cm$^2$) as an anode was coated on a diffusion layer using a bar coater, the supported catalyst prepared in Preparation Example 1 (0.44 mg/cm$^2$ (Pt)) as a cathode was coated on a diffusion layer using a bar coater, and phosphoric acid doped poly(2,5-benzimidazole) was used an electrolyte membrane. The prepared anode, cathode, and electrolyte membrane were treated using a cold pressing to prepare a membrane and electrode assembly (MEA). In the MEA structure, catalyst layers and electrodes were sequentially laminated on both surfaces of a hydrogen ion conductive polymer membrane. Separation plates for supplying fuels and supplying oxidizing agents were respectively attached to the anode and the cathode to prepare a fuel cell according to an embodiment of the present invention.

Evaluation of Fuel Cell

Separation plates for supplying fuels and supplying oxidizing agents were respectively attached to the anode and the cathode of the fuel cell prepared in Example 1, and unit cells were evaluated. Operating conditions were as follows. Hydrogen as a fuel: 100 ml/min, air as an oxidizing agent: 250 ml/min, and an operating temperature: 150° C.

Figure 9:
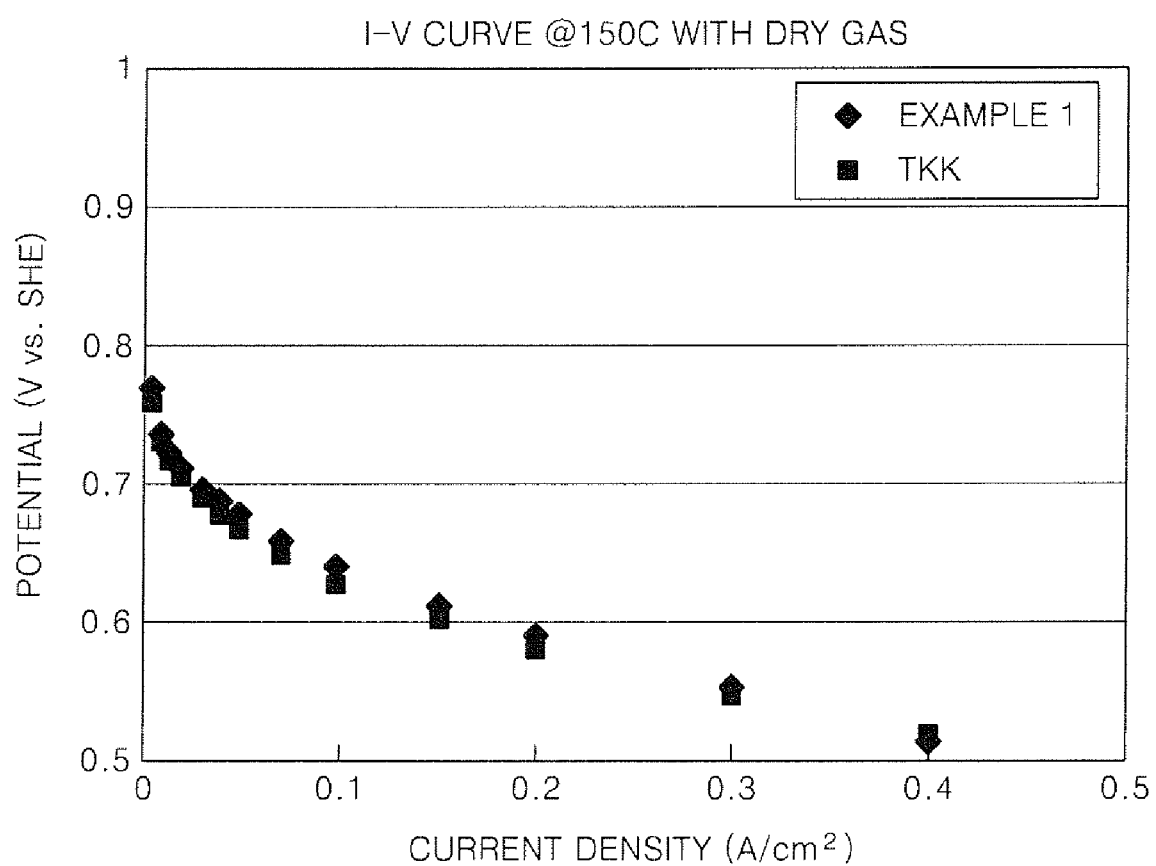
FIG. 9 is a graph illustrating the relationship between cell potential and current density in a fuel cell prepared according to an embodiment of the present invention.

FIG. 9 is a graph illustrating the relationship between cell potential and current density in the fuel cell prepared according to Example 1.

FIG. 9 shows test results of fuel cells when electrodes using a supported catalyst prepared in Preparation Example 1 (referred to in FIG. 9 as "Example 1") and a commercially available PtCo/C TEC 36E52 catalyst obtained from TKK Co (referred to in FIG. 9 as "TKK"). PtCo/KB (0.44 mg/cm$^2$) was used as the supported catalyst of Preparation Example 1, and PtCo/KB (0.82 mg/cm$^2$) was used as the conventionally available supported catalyst. According to FIG. 9, although the amount of the supported catalyst of Preparation Example 1 was half as much as that of the commercially available catalyst, the cell potential of the supported catalyst of Preparation Example 1 was slightly higher than that of the commercially available catalyst. Thus, the supported catalyst of Preparation Example 1 can be considered to be more efficient than a conventional supported catalyst.

A supported catalyst including alloy catalyst particles according to aspects of the present invention can have excellent membrane efficiency in electrodes for fuel cells due to a uniform alloy composition of a catalyst particle and supported catalysts that are not agglomerated.

Although a few embodiments of the present invention have been shown and described, it would be appreciated by those skilled in the art that changes may be made in this without departing from the principles and spirit of the invention, the scope of which is defined in the claims and their equivalents.

What is claimed is:

1. A supported catalyst comprising:
   a carbonaceous catalyst support; and
   first metal-second metal alloy catalyst particles adsorbed on the surface of the carbonaceous catalyst support,
   wherein a difference between a D10 value and a D90 value is in the range of 0.1 to 10 nm wherein the D10 value is a mean diameter of a randomly selected 10 wt % of the first metal-second metal alloy catalyst particles and the D90 value is a mean diameter of a randomly selected 90 wt % of the first metal-second metal alloy catalyst particles.

2. The supported catalyst of claim 1, wherein 99.5 to 100% of the diameters of the first metal-second metal alloy catalyst particles are within the range of 2 to 20 nm.

3. The supported catalyst of claim 1, wherein the amount of the first metal in the first metal-second metal alloy catalyst particles is in the range of 40 to 60 wt % based on the total weight of the supported catalyst.

4. The supported catalyst of claim 1, wherein the amount of the second metal of the first metal-second metal alloy catalyst particles is in the range of 0.01 to 5 wt % based on the total weight of the supported catalyst.

5. The supported catalyst of claim 1, wherein a mean particle diameter of the first metal-second metal alloy catalyst particles is less than 5 nm.

6. The supported catalyst of claim 1, wherein the first metal is selected from the group consisting of Pt, Ru, Pd, Rh, Ir, Os and Au.

7. The supported catalyst of claim 1, wherein the second metal is selected from the group consisting of Co, Ni, Cu, Zn, V, Cr, Mn, Fe and Ti.

8. The supported catalyst of claim 1, wherein a difference in an atomic percentage of the second metal based on 100 atomic percent of the first metal-second metal alloy at two randomly selected regions on a first metal-second metal alloy catalyst particle of the supported catalyst is less than 30 percent.

9. The supported catalyst of claim 1, wherein the first metal is Pt, and the second metal is Co.

10. A method of preparing a supported catalyst, the method comprising:
preparing a first metal catalyst precursor solution by mixing a first metal catalyst precursor and a polyol;
preparing a carbonaceous catalyst support solution by mixing a carbonaceous catalyst support, a polyol and water;
mixing the first metal catalyst precursor solution and the carbonaceous catalyst support solution to obtain a first mixture;
adjusting the pH of the first mixture to be in a predetermined range, and heating and cooling the first mixture;
preparing a second metal catalyst precursor solution by mixing a second metal catalyst precursor with water;
adding the second metal catalyst precursor solution to the pH-adjusted first mixture to obtain a second mixture, and adjusting the pH of the second mixture;
filtering, washing, and drying the pH-adjusted second mixture;
reducing filtered, washed and dried second mixture in a gas phase; and
purifying, washing, and drying the gas phase reduced second mixture.

11. The method of claim 10, wherein the polyol used in preparing the first metal catalyst precursor solution and the polyol used in preparing the second catalyst precursor solution are the same or different and are selected from the group consisting of ethylene glycol, diethylene glycol, triethylene glycol, and a mixture thereof.

12. The method of claim 10, wherein the adjusting of the pH of the first mixture comprises adjusting the pH of the first mixture to be in the range of 9 to 13; the heating of the pH-adjusted first mixture comprises heating the first mixture to a temperature of 90 to 115° C., and the cooling of the heated first mixture comprises cooling the heated first mixture to a temperature of 20 to 25° C.

13. The method of claim 10, wherein, in the preparing of the second metal catalyst precursor solution, the amount of the second metal catalyst precursor is in the range of 1 to 2.5 parts by weight based on 100 parts by weight of the second metal catalyst precursor solution.

14. The method of claim 10, wherein adjusting the pH of the second mixture comprises adjusting the pH of the second mixture to be in the range of 8 and 10.

15. The method of claim 10, wherein the second metal catalyst precursor is $Co(OH)_2$ or $Co(NO_3)_2$.

16. The method of claim 10, wherein the reducing of the filtered, washed and dried second mixture in a gas phase is carried out at a temperature of 300 to 350° C.

17. A supported catalyst formed by the method of claim 10.

18. A supported catalyst comprising:
a carbonaceous catalyst support; and
first metal-second metal alloy catalyst particles adsorbed on the surface of the carbonaceous catalyst support,
wherein 99.5 to 100% of the diameters of the first metal-second metal alloy catalyst particles are within the range of 2 to 20 nm.

19. A cathode electrode comprising a supported catalyst according to claim 1.

20. A fuel cell comprising a cathode electrode comprising a supported catalyst according to claim 1.

21. The fuel cell of claim 20, wherein the fuel cell is a polymer electrolyte membrane fuel cell (PEMFC).

* * * * *